United States Patent
Marchesini et al.

(10) Patent No.: US 10,047,587 B2
(45) Date of Patent: Aug. 14, 2018

(54) METHODS FOR PRODUCING FLUID INVASION RESISTANT CEMENT SLURRIES

(71) Applicant: Halliburton Energy Services, Inc., Houston, TX (US)

(72) Inventors: Flavio H. Marchesini, Rio de Janeiro (BR); Rafael Menezes De Oliveira, Rio de Janeiro (BR); Merouane Khammar, The Woodlands, TX (US); Ashok K. Santra, The Woodlands, TX (US); Maria das Dores M. Paiva, Natal (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/434,702

(22) PCT Filed: Oct. 21, 2013

(86) PCT No.: PCT/US2013/065941
§ 371 (c)(1),
(2) Date: Apr. 9, 2015

(87) PCT Pub. No.: WO2014/070503
PCT Pub. Date: May 8, 2014

(65) Prior Publication Data
US 2015/0284621 A1   Oct. 8, 2015

Related U.S. Application Data

(60) Provisional application No. 61/720,662, filed on Oct. 31, 2012.

(51) Int. Cl.
*E21B 33/138* (2006.01)
*E21B 33/14* (2006.01)
(Continued)

(52) U.S. Cl.
CPC ........ *E21B 33/138* (2013.01); *C04B 40/0032* (2013.01); *C09K 8/46* (2013.01);
(Continued)

(58) Field of Classification Search
None
See application file for complete search history.

(56) References Cited

U.S. PATENT DOCUMENTS 4,407,365 A * 10/1983 Cooke, Jr. ............... 166/249
4,440,226 A    4/1984 Suman
(Continued)

FOREIGN PATENT DOCUMENTS

WO    2014070503 A1    5/2014

OTHER PUBLICATIONS de Souza Mendes, P.R., "Thixotropic elasto-viscoplastic model for structured fluids" Soft Matter, 7, pp. 2471-2483, 2011.
(Continued)

*Primary Examiner* — Anuradha Ahuja
(74) *Attorney, Agent, or Firm* — McDermott Will & Emery LLP

(57) ABSTRACT

Embodiments including methods comprising providing a wellbore in a subterranean formation having a wellbore length; providing a proposed cement slurry formulation; calculating a normalized pressure at a point along the wellbore length based on properties of the proposed cement slurry formulation and properties of the wellbore in the subterranean formation; manipulating the proposed cement slurry formulation based on the normalized pressure so as to produce a fluid invasion resistant cement slurry; introducing the fluid invasion resistant cement slurry into the wellbore; and cementing the fluid invasion resistant cement slurry in the wellbore.

12 Claims, 1 Drawing Sheet

(51) Int. Cl.
*C09K 8/46* (2006.01)
*C04B 40/00* (2006.01)
*C09K 8/467* (2006.01)
*C09K 8/48* (2006.01)

(52) U.S. Cl.
CPC ............... *C09K 8/467* (2013.01); *C09K 8/48* (2013.01); *E21B 33/14* (2013.01)

(56) References Cited

U.S. PATENT DOCUMENTS

| | | | |
|---|---|---|---|
| 4,524,828 A | | 6/1985 | Sabins et al. |
| 4,655,286 A | * | 4/1987 | Wood ............................. 166/285 |
| 4,941,536 A | | 7/1990 | Brothers et al. |
| 5,020,594 A | * | 6/1991 | Gill ............................. 166/285 |
| 6,296,057 B2 | * | 10/2001 | Thiercelin ..................... 166/285 |
| 6,626,243 B1 | | 9/2003 | Go Boncan |
| 6,922,637 B2 | * | 7/2005 | Ravi et al. ........................ 702/6 |
| 7,792,250 B1 | * | 9/2010 | Iverson ................... C09K 8/46 378/70 |
| 2004/0083058 A1 | * | 4/2004 | Ravi et al. ........................ 702/6 |
| 2005/0211468 A1 | * | 9/2005 | Veeningen et al. ............. 175/24 |
| 2007/0062691 A1 | * | 3/2007 | Reddy et al. ............ 166/250.01 |
| 2010/0212892 A1 | * | 8/2010 | Santra et al. ............ 166/250.14 |
| 2011/0290485 A1 | * | 12/2011 | Cooke, Jr. ..................... 166/286 |
| 2012/0018154 A1 | * | 1/2012 | James ............................ 166/293 |

OTHER PUBLICATIONS

Cooke, C. E., Jr., M.P. Kluck and R. Medrano, "Field measurements of annular pressure and temperature during primary cementing," SPE 11206, 57th SPE Conference, New Orleans, Sep. 1982.
Prohaska, M. et al., "Determining Wellbore Pressures in Cement Slurry Columns," SPE 26070, pp. 407-415, 1993.
Nishikawa, S. and Wojtanowicz, A.K., "Transient Pressure Unloading—A Model of Hydrostatic Pressure Loss in Wells after Cement Placement," SPE 77754, 2002.
Chenevert, M.E., "Model for Predicting Wellbore Pressures in Cement Columns," SPE 19521, pp. 35-47, 1989.
Crook, R., "Gas Migration: What Causes it and How to Prevent or Control it," Halliburton Technical Paper, Dec. 2008.
Cooke, C. E., Kluck, M. P., and Medrano, R.: "Annular Pressure and Temperature Measurements Diagnose Cementing Operations", paper IADC/SPE 11416, SPE Reprint Series n° 34, 1983.
International Search Report and Written Opinion for PCT/US2013/065941 dated Jan. 17, 2014.
Daccord, G. de Rozieres, J., and Boussouira, B.: "Cement Slurry Behaviour during Hydration and Consequences for Oil-Well Cementing" paper presented at the 1991 Intl. Workshop on Hydration and Setting, Dijon, France, July.
Tinsley, J.M., Miller, E.C, Sabins, F.L., and Sutton, D.L.: "Transition Time of Cement Slurries Between the Fluid and Set States," SPE 9285, vol. 22, No. 6, Dec. 1982.
Prohaska, M. et al., "Modeling Early-Time Gas Migration Through Cement Slurries," SPE Drilling & Completion, Sep. 1995, pp. 178-256.
Tinsley, J.M., et al., "Study of Factors Causing Annular Gas Flow Following Primary Cemnenting," J. Pet. Tech., pp. 1427-1437, Aug. 1980.
Supplementary Search Report received in corresponding EP Application No. 13851070, dated Jun. 15, 2016.
Larry T. Watters et al., "SPE 9287: Field Evaluation of Method to Control Gas Flow Following Cementing," SPE, Sep. 24, 1980, XP55278113.
Dennis C. Levine et al., "Annular gas flow after cementing: a look at practical solutions," SPE Annual Technical Conference and Exhibition, Sep. 23-16, 1979, Las Vegas, Nevada, Society of Petroleum Engineers, No. 8255-MS, Sep. 23, 1979, pp. 1-11, XP002676780, DOI: 10.2118/8255-MS, ISBN: 978-1-55563-706-4.
P. Drecq et al., "SPE 17629: A Single Technique Solves Gas Migration Problems Across a Wide Range of Conditions," SPE, Nov. 4, 1988, XP55278107.

\* cited by examiner

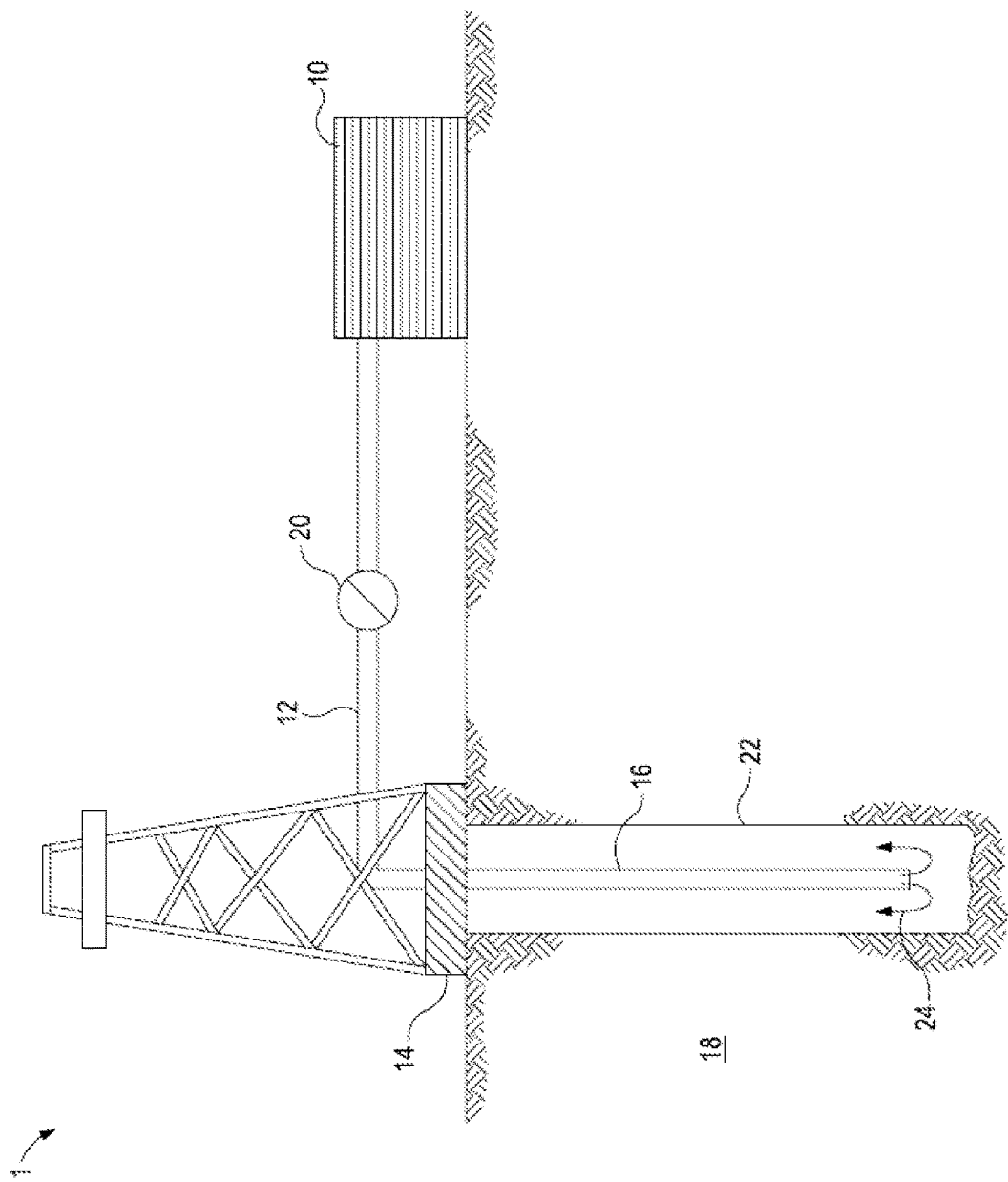

METHODS FOR PRODUCING FLUID INVASION RESISTANT CEMENT SLURRIES

CROSS-REFERENCE TO RELATED APPLICATIONS

This application claims priority to provisional application number 61/720,662 filed on Oct. 31, 2012 and titled "Methods for Producing Fluid Invasion Resistant Cement Slurries."

BACKGROUND

The embodiments herein relate to methods for producing cement slurries that are resistant to fluid invasion when placed into a wellbore.

Subterranean formation operations (e.g., stimulation operations, sand control operations, completion operations, etc.) often involve placing a cement column around a casing or liner string in a wellbore. The cement column is formed by pumping a cement slurry downhole through the casing and upwards through the annular space between the outer casing wall and the formation face of the wellbore. After placement, the cement slurry develops into a gel and then cures in the annular space, thereby forming a column of hardened cement that, inter alia, supports and positions the casing in the wellbore and bonds the exterior surface of the casing to the subterranean formation. Among other things, the cement column may keep fresh water zones from becoming contaminated with produced fluids from within the wellbore. As used herein, the term "fluid" refers to liquid phase and gas phase materials. The cement column may also prevent unstable formations from caving in, thereby reducing the chance of a casing collapse or a stuck drill pipe. Finally, the cement column forms a solid barrier to prevent fluid loss to the formation, contamination of production zones, or undesirable fluid invasion into the well. Therefore, the degree of success of a subterranean formation operation depends, at least in part, upon the successful cementing of the wellbore casing.

Fluid invasion into a cement column is a known problem encountered in primary cementing operations. As used herein, the term "primary cementing" refers to the process of placing a cement column around a casing or liner string. Fluid invasion may occur before the cement slurry is cured, which may be particularly damaging, or after the cement slurry is cured. The trigger mechanism for fluid invasion may be the presence of an underbalanced pressure (e.g., the pressure of a given depth inside the cement column may be smaller than the formation pressure at that depth or nearby depths). A number of other factors may also influence fluid invasion including, but not limited to, properties of the subterranean formation and properties of the cement slurry (e.g., rheological properties). As used herein, the term "fluid invasion potential" is used to describe the tendency of fluid to invade a cement slurry or column by any mechanism. When combined with buoyancy effects, fluid invasion may result in the formation of channels within the cement column. As used herein, the term "channel" refers to a defect in the quality of cement, where the cement does not fully occupy the annulus between the casing and the formation face. The channels may result in loss of integrity of the cement column, failure of zonal isolation, and/or wellbore structural failure.

Because of the damaging effects of fluid invasion into a cement column, a number of evaluation methods have been proposed to evaluate the potential of fluid invasion, especially during the time in which the cement slurry has not yet cured. These methods, however, may be oversimplified and not properly capture multiple factors that may influence fluid invasion. As a result, the predictive capabilities of such methods may be limited.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the fluid invasion resistant cement slurries of the embodiments described herein to a downhole location.

DETAILED DESCRIPTION

The embodiments herein relate to methods for producing cement slurries that are resistant to fluid invasion when placed into a wellbore. Specifically, the embodiments herein relate to compatibility studies used to predict fluid invasion potential at any particular point in time and at any particular depth in a wellbore after cement placement in order to produce fluid invasion resistant cement slurries.

The embodiments herein may be used to predict fluid invasion into a cement column after primary well cementing using a normalized pressure to determine the likelihood of fluid invasion of formation fluid into a cement slurry column in a wellbore in a subterranean formation. As used herein, the term "normalized pressure" refers to the ratio between the cement slurry pressure inside the annulus and the subterranean formation pressure. Once the normalized pressure is determined for a specific slurry, that cement slurry can be manipulated to correct for fluid invasion potential. The embodiments described herein may take into account one or more properties of the subterranean formation itself and the cement slurry itself. Depending on the particular application, some properties may be more instructive to determine the potential for fluid invasion after primary cementing than other properties. One of ordinary skill in the art, with the benefit of this disclosure, will recognize what factors to consider for a particular application.

Some embodiments described herein provide methods of cementing a subterranean wellbore. The methods comprise providing a wellbore in a subterranean formation and providing a proposed cement slurry formulation. Next, the normalized pressure of the proposed cement slurry formulation is determined at a point along the wellbore length. If the normalized pressure is in a range in which fluid invasion potential exists, the proposed cement slurry formulation is manipulated, and one or more revised normalized pressure is determined. The cement slurry may be manipulated and the corresponding normalized pressure recalculated as many times as necessary until an acceptable cement slurry formulation, herein referred to as "fluid invasion resistant cement slurry," is found. Next, the fluid invasion resistant cement slurry is introduced into the wellbore in the subterranean formation and the cement is allowed to cure and form a cement sheath within the subterranean formation. One of skill in the art will recognize that manipulation of the cement slurry can take many forms. By way of non-limiting example, the amount of cement retarder, accelerator, cementitious material, pozzolanic material, or water may be changed.

I. Cement Slurry and Fluid Invasion Resistant Cement Slurry

In some embodiments, the cement slurry may comprise a base fluid and a cementitious material. Any aqueous base fluid suitable for use in a subterranean operation (e.g., drilling or completion operations) may be used in the cement slurry described in some embodiments herein. Suitable base fluids for use in the embodiments described herein may include, but are not limited to, freshwater, saltwater (e.g., water containing one or more salts dissolved therein), brine (e.g., saturated saltwater), seawater, and any combination thereof. Generally, the base fluid may be from any source, provided, for example, that it does not contain an excess of compounds that may undesirably affect other components in the salt-tolerant cement slurry. In some embodiments, the base fluid may be included in an amount sufficient to form a pumpable slurry. In some embodiments, the base fluid in the cement slurry may be foamed. In some embodiments, the base fluid may be included in the cement slurry in an amount of about 40% to about 200% by weight of ("w/w") the dry cementitious material. In other embodiments, the base fluid may be included in an amount of about 30% to about 150% w/w of the dry cementitious material.

The cementitious material may be any cementitious material suitable for use in subterranean operations. In preferred embodiments, the cementitious material is a hydraulic cement. Hydraulic cements harden by the process of hydration due to chemical reactions to produce insoluble hydrates (e.g., calcium hydroxide) that occur independent of the cement's water content (i.e., hydraulic cements can harden even under constantly damp conditions). Thus, hydraulic cements are preferred because they are capable of hardening regardless of the water content of a particular subterranean formation. Suitable hydraulic cements include, but are not limited to Portland cement; Portland cement blends (e.g., Portland blast-furnace slag cement and/or expansive cement); non-Portland hydraulic cement (e.g., super-sulfated cement, calcium aluminate cement, and/or high magnesium-content cement); and any combination thereof. In some embodiments, the cementitious material is present in an amount of about 20% to about 70% w/w of the salt-tolerant cement slurry.

In some embodiments, the cement slurry may additionally comprise a pozzolanic material. Pozzolanic materials may aid in increasing the density and strength of the cementitious material. As used herein, the term "pozzolanic material" refers to a siliceous material that, while not being cementitious, is capable of reacting with calcium hydroxide (which may be produced during hydration of the cementitious material). Because calcium hydroxide accounts for a sizable portion of most hydrated hydraulic cements and because calcium hydroxide does not contribute to the cement's properties, the combination of cementitious and pozzolanic materials may synergistically enhance the strength and quality of the cement. Any pozzolanic material that is reactive with the cementitious material may be used in the embodiments described herein. Suitable pozzolanic materials may include, but are not limited to silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof. An example of a suitable commercially-available pozzolanic material is POZMIX®-A available from Halliburton Energy Services, Inc. of Houston, Tex. In some embodiments, the pozzolanic material may be present in an amount of about 5% to about 60% w/w of the dry cementitious material. In preferred embodiments, the pozzolanic material is present in an amount of about 5% to about 30% w/w of the dry cementitious material.

In some embodiments, the cement slurry may further comprise any cement additive capable of use in a subterranean operation. Cement additives may be added to the cement slurry to modify the characteristics of the slurry or cured cement. Such additives include, but are not limited to, a cement accelerator; a cement retarder; a fluid-loss additive; a cement dispersant; a cement extender; a weighting agent; a lost circulation additive; and any combinations thereof. The cement additives may be in any form, including powder form or liquid form.

In some embodiments, cement slurry may comprise a base fluid, a cementitious material, and any of one, more than one, or all of a pozzolanic material and a cement additive. The properties of the cement slurry and the properties of the subterranean formation into which the cement slurry is to cure are used to determine the normalized pressure as described herein. Based on the value of the normalized pressure, the cement slurry is then manipulated either by adding, removing or adjusting the presence or absence or amount of the base fluid, cementitious material, pozzolanic material, if present, or cement additive, if present, to produce a fluid invasion resistant cement slurry particular to the formation at issue. As used herein, the term "fluid invasion resistant cement" refers to a cement slurry made in accordance with the teachings of the present disclosure that has a normalized pressure greater than 1 along the entire well depth before the cement slurry is cured. In some embodiments, a safety margin may be recommended and the normalized pressure may be greater than 1 plus the safety margin. The safety margin may vary depending on the properties of the proposed cement slurry, on the properties of the formation, and on the geometry of the well, and may, in some embodiments range from a lower limit of about 0.1, 0.15, 0.2, 0.25, 0.3, and 0.35 to an upper limit of about 0.6, 0.55, 0.5, 0.45, 0.4, and 0.35. In some embodiments, it may be preferred that the pressure in the cement column be compared to the pressure in the formation. In some embodiments, the components of the cement slurry may be adjusted, removed, and/or added to produce the fluid invasion resistant cement slurry.

II. Normalized Pressure

In some embodiments, a normalized pressure may be determined for predicting the potential of fluid invasion into a cement column after primary well cementing. The normalized pressure describes the potential of fluid invasion into a cement column after placement of the cement slurry into a subterranean formation at any particular point in time and depth of the formation. The normalized pressure is a function of time after cement placement and depth of the wellbore and may be expressed at a point along the wellbore. Use of the term "at a point" may represent either a particular wellbore depth location, the entire wellbore depth, or any set of points in the wellbore at any instance of time after placement of the proposed cement slurry or the fluid invasion resistant cement slurry, as described herein. The normalized pressure is determined based on one or more normalized pressure parameters of the proposed cement slurry or the fluid invasion resistant cement slurry and the pressure of the subterranean formation into which the slurries are to be placed. Generally, the normalized pressure accounts for the interaction of the formation and the cement slurry, which may contribute to fluid invasion. The normalized pressure may vary depending on the depth of the well, the conditions in the well, the conditions of the cement slurry, the conditions of the formation, and the like.

Inclusion of a normalized pressure may advantageously provide for, in some embodiments, (1) invariant parameters for fluid invasion, (2) the same parameters and variant parameters for fluid invasion, and/or (3) inclusion of transient elasto-viscoplastic effects.

Suitable normalized pressure parameters for use in determining the normalized pressure may include, but are not limited to, those listed in Table 1.

TABLE 1

Nonlimiting Examples of Normalized Pressure Parameters

| | |
|---|---|
| Mass Balance | $\frac{\partial \rho}{\partial t} = -v_z \frac{\partial \rho}{\partial z} - \rho \frac{\partial v_z}{\partial z} - \frac{4d_o}{(d_o^2 - d_i^2)} \rho_f v_f$ |
| Momentum Balance | $\rho\left(\frac{\partial v_z}{\partial t} + v_z \frac{\partial v_z}{\partial z}\right) = -\frac{4}{(d_o - d_i)} \overline{\tau}_{tz} - \frac{\partial P}{\partial z} + \rho g$ |
| Compressibility | $\frac{\partial \rho}{\partial t} = \beta \rho \frac{\partial P}{\partial t}$ |
| | $\frac{\partial \rho}{\partial z} = \beta \rho \frac{\partial P}{\partial z}$ |
| | $\rho = \frac{\rho_0}{1 - \beta(p - p_0)}$ |
| Shrinkage | $\rho = \frac{\rho_0}{1 - S(t)}(1 + \beta P)$ |
| Shear Rate | $\dot{\gamma} = \frac{\overline{v}_z}{d_o - d_i}$ |
| Rheological Properties | $\tau + \theta_1 \dot{\tau} = \eta_v(\dot{\gamma} + \theta_2 \ddot{\gamma})$ |
| | $\theta_1(\lambda) = \left(1 - \frac{\eta_\infty}{\eta_v(\lambda)}\right)\frac{\eta_v(\lambda)}{G_s(\lambda)}$ |
| | $\theta_2(\lambda) = \left(1 - \frac{\eta_\infty}{\eta_v(\lambda)}\right)\frac{\eta_\infty}{G_s(\lambda)}$ |
| | $G_s = \frac{G_o}{\lambda^m}$ |
| | $\eta_v(\lambda) = \left(\frac{\eta_o}{\eta_\infty}\right)^\lambda \eta_\infty$ |
| | $\frac{d\lambda}{dt} = \frac{1}{t_{eq}}\left[(1-\lambda)^a - (1-\lambda_{ss})^a \left(\frac{\lambda}{\lambda_{ss}}\right)^b \left(\frac{\tau}{\eta_v(\lambda)\dot{\gamma}}\right)^c\right]$ |
| | $\lambda_{ss}(\dot{\gamma}) = \left(\frac{\ln\eta_{ss}(\dot{\gamma}) - \ln\eta_\infty}{\ln\eta_o - \ln\eta_\infty}\right)$ |
| | $\eta_{ss}(\dot{\gamma}) = \left[1 - \exp\left(-\frac{\eta_o \dot{\gamma}}{\tau_o}\right)\right]\left\{\frac{\tau_o - \tau_{od}}{\dot{\gamma}} e^{-\dot{\gamma}/\dot{\gamma}_{od}} + \frac{\tau_{od}}{\dot{\gamma}} + K\dot{\gamma}^{n-1}\right\} + \eta_\infty$ |

Where:
| | |
|---|---|
| ρ | is the density within the cement |
| $v_z$ | is the downward velocity of the cement at well depth, z |
| $d_o$ | is the diameter of the well |
| $d_i$ | is the diameter of the casing |
| $\rho_f$ | is the density of fluid loss from the cement to the subterranean formation |

TABLE 1-continued

Nonlimiting Examples of Normalized Pressure Parameters

| | |
|---|---|
| $v_f$ | is the velocity of fluid loss from the cement to the subterranean formation |
| $\overline{\tau}_{tz}$ | is the average shear stress of an annular element of the cement column |
| g | is gravity |
| β | is the compressibility of the cement |
| S(t) | is the shrinkage of the cement |
| P | is the pressure inside the cement column at well depth, z |
| γ | is the shear rate of the cement |
| λ | is the structure parameter of the cement |
| $G_s$ | is the shear modulus of the cement |
| $\eta_s$ | is the structural viscosity of the cement |
| $\theta_1$ | is the relaxation time of the cement for a given level of the structure measured by λ |
| $\theta_2$ | is the retardation time of the cement for a given level of the structure measured by λ |
| $\eta_v$ | is the purely viscous character of the viscosity represented by, $\eta_v = \eta_s + \eta_\infty$ |
| $\eta_\infty$ | is the steady-state viscosity of the unstructured state of the cement |
| $G_o$ | is the shear modulus of the structured state cement |
| m | is a dimensionless positive constant |
| $\eta_o$ | is the steady-state viscosity of the structured state of the cement |
| $\gamma_{ss}$ | is the steady-state structure parameter of the cement |
| $\eta_{ss}$ | is the steady-state viscosity of the cement |
| $t_{eq}$ | is the equilibrium time |
| a | is a dimensionless positive constant |
| b | is a dimensionless positive constant |
| c | is a dimensionless positive constant |
| $\tau_o$ | is the static yield stress of the cement |
| $\tau_{od}$ | is the dynamic yield stress of the cement |
| K | is the consistency index of the cement |
| n | is the power-law index of the cement |

One skilled in the art with the benefit of this disclosure will understand the relationship between the various nonlimiting normalized pressure parameters in order to determine the normalized pressure of the cement slurry. The normalized pressure takes into account properties of the cement slurry and the subterranean formation to determine the potential of fluid invasion. The cement slurry pressure inside the annulus is determined using the mass balance, momentum balance, compressibility, shrinkage, shear rate, and rheological properties of the cement. The compressibility of the cement slurry is determined using the slightly compressible material hypothesis, known to those of ordinary skill in the art. The chemical shrinkage of the cement slurry, known to those of ordinary skill in the art, can also be used in the embodiments described herein. The nonlimiting rheological properties are used as inputs to determine the shear stress. Examples of nonlimiting rheological properties may include shear stress; relaxation time; retardation time; viscosity; structural shear modulus; structural viscosity; steady shear flow; steady-state viscosity; consistency index; power law index;

static yield stress; dynamic yield stress; steady-state viscosity of an unstructured state; steady-state viscosity of a structured state; equilibrium time; and any combinations thereof.

The choice of a normalized pressure parameter for determining the normalized pressure may be dependent upon the composition of the cement slurry, both chemical and concentration (e.g., the concentration and structure of the various chemicals and additives in the cement slurry). One skilled in the art, with the benefit of this disclosure should be able to identify a parameter to include to determine the normalized pressure of a particular cement slurry. For example, a summation of all of the parameters listed in Table 1 may be one of the more versatile models. This may advantageously allow for taking into account a comprehensive view of the cement properties to ensure that the normalized pressure is highly accurate. As used herein, the "normalized pressure" refers to the potential of fluid invasion into the cement column after primary well cementing as determined by the equation shown in Table 2.

TABLE 2

Normalized Pressure $$P^* = \frac{P}{P_{formation}}$$

Where:
P*      is the normalized pressure
P      is the pressure of the cement
$P_{formation}$      is the formation pressure The pressure inside the cement, P, is determined using any or all of the normalized pressure parameters listed in Table 1. The formation pressure, $P_{formation}$, is determined based on the precise subterranean formation in front of which the cement slurry is meant to be placed. The formation properties suitable for use in determining the normalized pressure may include, but are not limited to, permeability, capillary pressure, swelling capacity, stress, well dimensions, and density. The formation properties for use in determining the normalized pressure may be obtained by any known method in the industry.

The normalized pressure is determined based on the normalized pressure parameters for the cement slurry and the formation. If the normalized pressure is greater than 1 along the entire well depth before the cement is cured, the risk of fluid invasion is drastically reduced. Therefore, manipulation of the cement slurry may not be required because the cement slurry is a fluid invasion resistant slurry. However, in some embodiments, the cement slurry may be manipulated to further enhance the normalized pressure, such as by a safety margin, so that the already fluid invasion resistant cement is more resistant to fluid invasion than the cement slurry without manipulation.

If the normalized pressure is less than 1, the potential for fluid invasion into the cement column after primary well cementing is high. Therefore, according to the embodiments described herein, the cement slurry is manipulated either by the addition, removal, substitution, or concentration adjustment of the base fluid, cementitious materials, and any additional components such as pozzolanic material or cement additives to produce a fluid invasion resistant cement slurry. In some embodiments, the manipulated cement is again evaluated to determine a revised normalized pressure. If necessary, the cement is again manipulated and another revised normalized pressure is determined until a fluid invasion resistant cement slurry is obtained. The process may be repeated as many times as necessary in order to obtain a fluid resistant cement slurry.

In various embodiments, systems configured for preparing, transporting, and delivering the fluid invasion resistant cement slurry described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a fluid invasion resistant cement slurry. The pump may be, for example, a high pressure pump or a low pressure pump, which may depend on, inter alia, the viscosity and density of the fluid invasion resistant cement slurry, the type of the cementing operation, and the like.

In some embodiments, the systems described herein may further comprise a mixing tank arranged upstream of the pump and in which the fluid invasion resistant cement slurry is formulated. In various embodiments, the pump (e.g., a low pressure pump, a high pressure pump, or a combination thereof) may convey the fluid invasion resistant cement slurry from the mixing tank or other source of the fluid invasion resistant cement slurry to the tubular. In other embodiments, however, the fluid invasion resistant cement slurry can be formulated offsite and transported to a worksite, in which case the fluid invasion resistant cement slurry may be introduced to the tubular via the pump directly from a transport vehicle or a shipping container (e.g., a truck, a railcar, a barge, or the like) or from a transport pipeline. In yet other embodiments, the cementing fluid may be formulated on the fly at the well site where components of the cementing fluid are pumped from a transport (e.g., a vehicle or pipeline) and mixed during introduction into the tubular. In any case, the fluid invasion resistant cement slurry may be drawn into the pump, elevated to an appropriate pressure, and then introduced into the tubular for delivery downhole.

FIG. 1 shows an illustrative schematic of a system that can deliver the fluid invasion resistant cement slurries described herein, according to one or more embodiments. It should be noted that while FIG. 1 generally depicts a land-based system, it is to be recognized that like systems may be operated in subsea locations as well. As depicted in FIG. 1, system 1 may include mixing tank 10, in which a fluid invasion resistant cement slurry may be formulated. Again, in some embodiments, the mixing tank 10 may represent or otherwise be replaced with a transport vehicle or shipping container configured to deliver or otherwise convey the cementing fluid to the well site. The fluid invasion resistant cement slurry may be conveyed via line 12 to wellhead 14, where the fluid invasion resistant cement slurry enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the fluid invasion resistant cement slurry may subsequently return up the wellbore in the annulus between the tubular 16 and the wellbore 22 as indicated by flow lines 24. In other embodiments, the cementing fluid may be reverse pumped down through the annulus and up tubular 16 back to the surface, without departing from the scope of the disclosure. Pump 20 may be configured to raise the pressure of the fluid invasion resistant cement slurry to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement is introduced into an annulus between a tubular and the wellbore and returns to the wellhead through the tubular), and the like).

It is also to be recognized that the disclosed fluid invasion resistant cement slurry may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a wellbore in a subterranean formation having a wellbore length; providing a proposed cement slurry formulation; calculating a normalized pressure at a point along the wellbore length based on properties of the proposed cement slurry formulation and properties of the wellbore in the subterranean formation; manipulating the proposed cement slurry formulation based on the normalized pressure so as to produce a fluid invasion resistant cement slurry; introducing the fluid invasion resistant cement slurry into the wellbore; and cementing the fluid invasion resistant cement slurry in the wellbore.

B. A method comprising: providing a wellbore in a subterranean formation having a wellbore length; providing a proposed cement slurry formulation; calculating a normalized pressure at a point along the wellbore length based on properties of the proposed cement slurry formulation and properties of the wellbore in the subterranean formation; manipulating the proposed cement slurry formulation based on the normalized pressure so as to produce a fluid invasion resistant cement slurry; wherein the properties of the proposed cement slurry formulation used to determine the normalized pressure are selected from the group consisting of: mass balance; momentum balance; compressibility; shrinkage; shear rate; rheological properties; and any combinations thereof; introducing the fluid invasion resistant cement slurry into the wellbore in the subterranean formation; and cementing the fluid invasion resistant cement slurry in the wellbore in the subterranean formation.

C. A method comprising: providing a wellbore in a subterranean formation having a wellbore length; providing a proposed cement slurry formulation; calculating a normalized pressure at a point along the wellbore length based on properties of the proposed cement slurry formulation and properties of the wellbore in the subterranean formation; manipulating the proposed cement slurry formulation based on the normalized pressure so as to produce a fluid invasion resistant cement slurry; wherein the properties of the proposed cement slurry formulation used to determine the normalized pressure are selected from the group consisting of: mass balance; momentum balance; compressibility; shrinkage; shear rate; rheological properties; and any combinations thereof; wherein the rheological properties are selected from the group consisting of: shear stress; relaxation time; retardation time; viscosity; structural shear modulus; structural viscosity; steady shear flow; steady-state viscosity; consistency index; power law index; static yield stress; dynamic yield stress; steady-state viscosity of an unstructured state; steady-state viscosity of a structured state; equilibrium time; and any combinations thereof; introducing the fluid invasion resistant cement slurry into the wellbore in the subterranean formation; and cementing the fluid invasion resistant cement slurry in the wellbore in the subterranean formation.

Each of embodiments A, B, and C may have one or more of the following additional elements in any combination:

Element 1: Wherein the normalized pressure is determined at multiple points along the wellbore length of the wellbore.

Element 2: Wherein the steps of: calculating a normalized pressure at a point along the wellbore length and manipulating the proposed cement slurry formulation based on the normalized pressure are repeated at least once so as to produce the fluid invasion resistant cement slurry.

Element 3: Wherein the proposed cement slurry formulation comprises a base fluid and a cementitious material.

Element 4: Wherein the proposed cement slurry formulation is manipulated to produce the fluid invasion resistant cement slurry by altering an amount of the cementitious material.

Element 5: Wherein the proposed cement slurry formulation further comprises a pozzolanic material; a cement accelerator; a cement retarder; a fluid-loss additive; a cement dispersant; a cement extender; a weighting agent; a lost circulation additive; or any combinations thereof.

Element 6: Wherein the pozzolanic material is selected from the group consisting of: silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof.

Element 7: Wherein the properties of the proposed cement slurry formulation used to determine the normalized pressure are selected from the group consisting of: mass balance; momentum balance; compressibility; shrinkage;

shear rate; rheological properties; and any combinations thereof.

Element 8: Wherein the rheological properties of the proposed cement slurry formulation used to determine the normalized pressure are selected from the group consisting of: shear stress; relaxation time; retardation time; viscosity; structural shear modulus; structural viscosity; steady shear flow; steady-state viscosity; consistency index; power law index; static yield stress; dynamic yield stress; steady-state viscosity of an unstructured state; steady-state viscosity of a structured state; equilibrium time; and any combinations thereof.

Element 9: Wherein the properties of the wellbore in the subterranean formation used to determine the normalized pressure are selected from the group consisting of: permeability; capillary pressure; swelling capacity; stress; well dimensions; density of the formation; and any combinations thereof.

By way of non-limiting example, exemplary combinations applicable to A, B, C include: A with 1, 5, and 7; B with 2, 8, and 9; and C with 3, 4, 5, and 6.

Therefore, the embodiments described herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a wellbore in a subterranean formation, the wellbore having a wellbore length;
   providing a proposed cement slurry formulation;
   calculating a normalized pressure (P*) at a point along the wellbore length based on a ratio of the proposed cement slurry formulation pressure (P) to the subterranean formation pressure ($P_{formation}$),
   wherein the proposed cement slurry formulation pressure is determined based on properties of the proposed cement slurry formulation, the properties being density ($\rho$) of the proposed slurry formulation, initial density ($\rho_0$) of the proposed slurry formulation, compressibility of the proposed cement slurry formulation ($\beta$), and shrinkage of the proposed cement slurry formulation (S(t)), and
   wherein the normalized pressure is determined based on the formula:

$$P^* = \frac{P}{P_{formation}}$$

and the proposed cement slurry formulation pressure is based on the formula:

$$\rho = \frac{\rho_0}{1 - S(t)}(1 + \beta P);$$

manipulating the proposed cement slurry formulation based on the normalized pressure so as to produce a fluid invasion resistant cement slurry, wherein the fluid invasion resistant cement slurry is produced to have a normalized pressure value greater than one (1) along the wellbore length before it is cured;
introducing the fluid invasion resistant cement slurry into the wellbore; and
curing the fluid invasion resistant cement slurry in the wellbore.

2. The method of claim 1, wherein the normalized pressure is determined at multiple points along the wellbore length of the wellbore.

3. The method of claim 2, wherein the proposed cement slurry formulation further comprises a pozzolanic material; a cement accelerator; a cement retarder; a fluid-loss additive; a cement dispersant; a cement extender; a weighting agent; a lost circulation additive; or any combinations thereof.

4. The method of claim 3, wherein the pozzolanic material is selected from the group consisting of: silica fume; metakaolin; fly ash; diatomaceous earth; calcined or uncalcined diatomite; calcined fullers earth; pozzolanic clays; calcined or uncalcined volcanic ash; bagasse ash; pumice; pumicite; rice hull ash; natural and synthetic zeolites; slag; vitreous calcium aluminosilicate; and any combinations thereof.

5. The method of claim 1, wherein the steps of: calculating a normalized pressure at a point along the wellbore length and manipulating the proposed cement slurry formulation based on the normalized pressure are repeated at least once so as to produce the fluid invasion resistant cement slurry.

6. The method of claim 1, wherein the proposed cement slurry formulation comprises a base fluid and a cementitious material.

7. The method of claim 6, wherein the proposed cement slurry formulation is manipulated to produce the fluid invasion resistant cement slurry by altering an amount of the cementitious material.

8. The method of claim 1, wherein the properties of the proposed cement slurry formulation used to determine the normalized pressure further take into account additional properties selected from the group consisting of: mass balance; momentum balance; shear rate; and any combinations thereof.

9. The method of claim 1, wherein the properties of the proposed cement slurry formulation used to determine the normalized pressure further take into account rheological properties, wherein the rheological properties are selected from the group consisting of: shear stress; relaxation time; retardation time; viscosity; structural shear modulus; structural viscosity; steady shear flow; steady-state viscosity; consistency index; power law index; static yield stress; dynamic yield stress; steady-state viscosity of an unstructured state;
   steady-state viscosity of a structured state; equilibrium time; and any combinations thereof.

10. A method comprising:
    providing a wellbore in a subterranean formation, the wellbore having a wellbore length;
    providing a proposed cement slurry formulation comprising a base fluid and a cementitious material;
    calculating a normalized pressure (P*) at a point along the wellbore length based on a ratio of the proposed cement slurry formulation pressure (P) to the subterranean formation pressure ($P_{formation}$), wherein the proposed cement slurry formulation pressure is determined based on properties of the proposed cement slurry formulation, the properties being density ($\rho$) of the proposed slurry formulation, initial density ($\rho_0$) of the proposed slurry formulation, compressibility of the proposed cement slurry formulation ($\beta$), and shrinkage of the proposed cement slurry formulation ($S(t)$), and wherein the normalized pressure is determined based on the formula:

$$P^* = \frac{P}{P_{formation}}$$

and the proposed cement slurry formulation pressure is based on the formula:

$$\rho = \frac{\rho_0}{1 - S(t)}(1 + \beta P);$$

manipulating the proposed cement slurry formulation based on the normalized pressure so as to produce a fluid invasion resistant cement slurry, wherein the fluid invasion resistant cement slurry is produced to have a normalized pressure value greater than one (1) along the wellbore length before it is cured;

introducing the fluid invasion resistant cement slurry into the wellbore; and curing the fluid invasion resistant cement slurry in the wellbore.

11. The method of claim 10, wherein the proposed cement slurry formulation further comprises a pozzolanic material; a cement accelerator; a cement retarder; a fluid-loss additive; a cement dispersant; a cement extender; a weighting agent; a lost circulation additive; or any combinations thereof.

12. The method of claim 10, wherein the properties of the proposed cement slurry formulation used to determine the normalized pressure further take into account additional properties selected from the group consisting of: mass balance; momentum balance; shear rate; and any combinations thereof.

* * * * *